(12) United States Patent
Deinken et al.

(10) Patent No.: US 7,353,840 B1
(45) Date of Patent: Apr. 8, 2008

(54) SPLIT NUT FOR OUTLET BOX INSTALLATION

(76) Inventors: Andrew Price Deinken, 8669 Steelhead Ave., Kings Beach, CA (US) 96143-2322; Marshall W. Henningsen, 1844 Calash Dr., Carson City, NV (US) 89703

( * ) Notice: Subject to any disclaimer, the term of this patent is extended or adjusted under 35 U.S.C. 154(b) by 146 days.

(21) Appl. No.: 11/377,319

(22) Filed: Mar. 16, 2006

(51) Int. Cl.
F16K 51/00 (2006.01)

(52) U.S. Cl. ...................... 137/360; 251/148
(58) Field of Classification Search ........... 137/360; 251/148; 411/437
See application file for complete search history.

(56) References Cited

U.S. PATENT DOCUMENTS

| | | | |
|---|---|---|---|
| 1,082,993 A | 12/1913 | Beattie | |
| 1,366,884 A | 1/1921 | Nahrung | |
| 1,375,781 A * | 4/1921 | De Long | 411/437 |
| 1,652,169 A | 12/1927 | Fleming | |
| 2,676,509 A | 4/1954 | Graham | |
| 4,274,323 A | 6/1981 | Resnicow | |
| 4,572,232 A * | 2/1986 | Gruber | 137/360 |
| 5,000,640 A * | 3/1991 | Haas, Jr. | 411/437 |
| 5,024,419 A * | 6/1991 | Mulvey | 251/148 |
| 5,538,299 A | 7/1996 | Nemeckay | |
| D387,971 S | 12/1997 | Nemeckay | |
| 5,836,627 A | 11/1998 | Nemeckay | |
| 6,003,536 A * | 12/1999 | Polverari et al. | 137/360 |
| 6,168,361 B1 * | 1/2001 | Adler | 411/437 |
| 6,352,439 B1 | 3/2002 | Stark et al. | |
| 6,402,206 B1 | 6/2002 | Simmons et al. | |
| 6,421,849 B1 * | 7/2002 | Gray | 137/360 |
| 6,460,901 B2 | 10/2002 | Rochelle | |
| 6,637,980 B2 * | 10/2003 | Robertson, Jr. | 405/259.1 |
| 6,799,930 B1 | 10/2004 | More et al. | |

* cited by examiner

Primary Examiner—John Fox

(57) ABSTRACT

An internally threaded split nut having an arcuate gap defining an opening large enough to pass over the outside diameter of a first tubular conduit or elongate rod section from the side, the split nut then being coaxially alignable and threadedly engageable with a cooperatively second threaded conduit or rod section having an outside diameter greater than that of the first section. Use of the subject split nut to releasably secure a water supply valve assembly having a REHAU® hose barb fitting to a wall of an in-wall appliance outlet box is also disclosed.

17 Claims, 2 Drawing Sheets

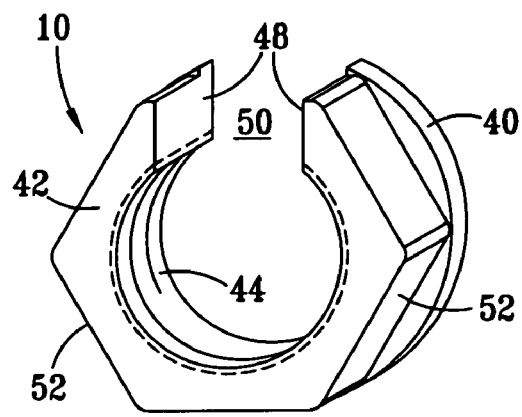
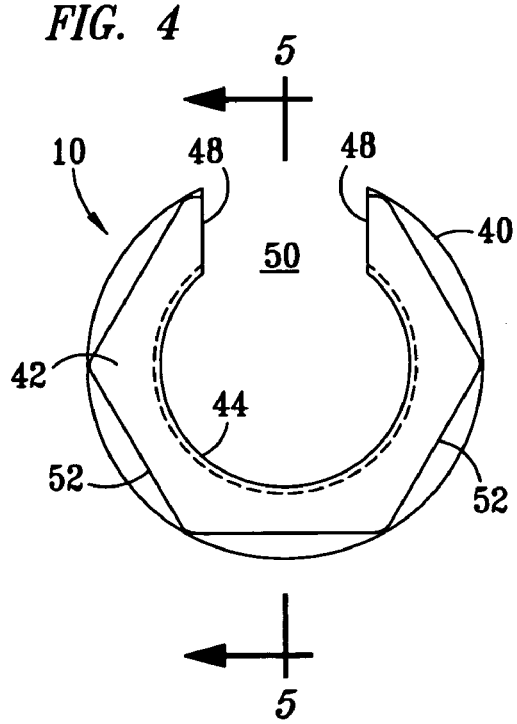
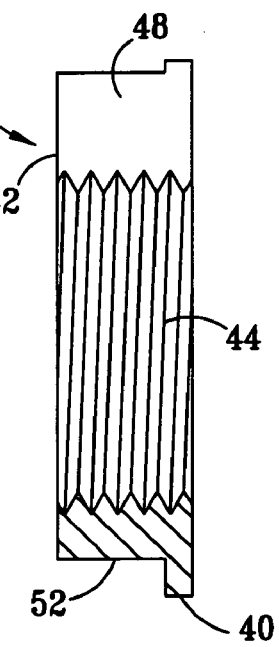

SPLIT NUT FOR OUTLET BOX INSTALLATION

BACKGROUND OF THE INVENTION

1. Field of the Invention

This invention relates to a split nut, and more particularly, to a split nut that facilitates attachment of a valve assembly to an in-wall outlet box of the type used with appliances such as washing machines, ice makers, and the like. The invention is particularly useful where the valve assembly includes a REHAU® PEX hose barb fitting that is pre-attached to the valve inlet.

2. Description of Related Art

In a conventional in-wall outlet box installation for household appliances, at least one water supply valve, preferably a quarter-turn ball valve, is used to provide a controllable flow of potable water to the appliance. Such water supply valves typically have a downwardly extending nipple with a male pipe thread that is inserted through an aperture in the bottom wall of the molded plastic outlet box, after which a nut is threaded upwardly onto the nipple and tightened until it contacts the underside of the bottom wall and securely attaches the ball valve to the outlet box.

In recent years, cross-linked polyethylene ("PEX") tubing has become popular for use as water supply lines to inlet valves for appliances such as washing machines, ice makers and the like. Such tubing is typically attached to the bottom of the inlet valve assembly by means of an EVERLOC® PEX hose fitting ("REHAU fitting") marketed by REHAU Incorporated, Leesburg, Va. Until now, the REHAU fitting that has been used when installing outlet boxes has a smooth-walled tubular section at one end and a hose barb at the other. The smooth end and the hose barb end of the fitting are typically separated by a radially extending flange having an outside diameter ("OD") significantly greater than the OD of either the smooth or hose barb sections. The flange serves as an anchor point for a tool that is used to crimp the PEX tubing to the hose barb. However, because the OD of the flange for a REHAU hose barb fitting of a given nominal diameter (e.g., ½ inch) is larger than the inside diameter ("ID") of a nut attachable to the male threads of a valve nipple having the same nominal diameter, the nut cannot be passed over the flange to attach the valve assembly to the outlet box if the REHAU fitting and valve nipple are connected prior to attachment of the valve to the outlet box. Therefore, it has been necessary for an installer first to attach the valve to the outlet box using a standard nut, and then to sweat the smooth end above the flange of a REHAU fitting into the bottom of the valve nipple.

A device and procedure are therefore needed that will enable a REHAU hose barb fitting to be manufactured as part of, or to be preattached to, a water supply valve assembly in such manner that the valve assembly can still be attached to an in-wall appliance outlet box by threading a nut into contact with a wall of the box.

Prior art patents disclose "split nuts" that typically have two opposed, internally threaded sections that are hinged or otherwise clamped together to form a circumferentially extending nut that can be quickly installed or released from an externally threaded bolt or shaft. Other patents disclose "split rings" and "snap rings" that are typically single-piece, substantially circular rings having a relatively small arcuate gap that can be widened by flexing the ring slightly during installation or removal. Although they are not typically threaded, split rings or snap rings may have spaced-apart tangs extending either radially inward or outward to prevent them from being displaced axially along the cylindrical shaft or conduit to which they are applied.

U.S. Pat. No. 6,799,930 discloses a spring-biased, quick-release nut. U.S. Pat. No. 6,460,901 discloses a split thread nut assembly for coupling a flanged pipe to a threaded pipe. U.S. Pat. No. 6,402,206 discloses a split ring with inwardly facing bosses that is used in a fitting for plastic tubing. U.S. Pat. No. 6,352,439 discloses a two-part connector for use in electrical junction boxes. The connector comprises an externally threaded portion that can be threaded into a box, and a spring steel snap ring that fits over the threads to hold the connector in the box and resist pull-out forces. U.S. Pat. Nos. 5,836,627, D387,971 and 5,538,299 disclose split nut locking devices, especially for support rods for auto hatchbacks. U.S. Pat. Nos. 5,000,640; 4,274,323; 2,676,509; 1,652,169; 1,366,884 and 1,082,993 all disclose internally threaded split nuts comprising at least two opposed sections that cooperate to define a nut providing full 360° coverage around an externally threaded pipe or bolt. Different mechanisms are provided for holding the two halves together.

SUMMARY OF THE INVENTION

The internally threaded split nut of the invention is preferred for use in installations: (1) where it cannot be conveniently threaded onto a structure having otherwise-cooperating male threads; and (2) where there is a smaller-diameter section adjacent to the male-threaded structure that has an OD sufficiently less than the ID of the split nut that the split nut can be translated laterally to a position disposed around the smaller-diameter section and in coaxial alignment with the male-threaded structure, and then threaded onto the male-threaded structure. The split nut must have an arcuate gap that is large enough to permit lateral translational movement of the split nut past the OD of the smaller-diameter section into a position that is coaxially aligned with the male-threaded structure. However, the arcuate gap must also be small enough that the split nut will remain threadedly engaged with the male-threaded structure during subsequent use.

Although many other uses of the split nut of the invention will become apparent to those of skill in the art upon reading this disclosure, a preferred use of the invention is for attaching water supply valve assemblies to in-wall mounted outlet boxes. The split nut of the invention is disclosed herein in relation to a particularly preferred use for securing quarter-turn valves to a wall of an outlet box for washing machines, ice makers, or other similar appliances.

Applicants have discovered that the attachment of a water supply valve assembly to an in-wall appliance outlet box is most easily achieved through use of an internally threaded, one-piece split nut as disclosed herein that can be translated laterally from a direction transverse to the major longitudinal axis of the valve assembly into coaxial alignment with a smaller-diameter section of a tubular section disposed above the flange of a hose barb fitting, preferably a hose barb fitting made by REHAU Incorporated, identified above. In this situation, the outside diameter of the split nut is typically greater than the OD of the aperture in the outlet box, which is in turn greater than the OD of the flange portion of the hose barb fitting.

Once the split nut is positioned so that it is coaxially aligned with an adjacent, externally threaded nipple section of the valve assembly, the split nut is then threaded onto the male threaded section to releasably secure the valve assembly to the outlet box. One preferred split nut of the invention comprises an arcuate gap in its perimeter having substantially parallel sides that define an opening about 0.015 in. greater than the OD of an unthreaded, tubular section around which it is to be applied.

By using the subject split nut, it is possible to insert the nipple of a water supply valve assembly having a hose barb fitting already attached to the end of the nipple opposite the valve through an aperture in an outlet box wall and then slide the split nut around the tubular section from the side and into coaxial alignment with the valve nipple above the flange of the hose barb fitting. The split nut can then be threaded onto the nipple to secure the valve to the outlet box wall. It will be appreciated, however, that the invention disclosed herein can be similarly utilized with cooperatively threaded sections of other structures, such as rods or bolts, that do not have tubular cross-sections but have adjacent or proximally disposed unthreaded sections having an OD slightly smaller than the ID of the associated split nut.

BRIEF DESCRIPTION OF THE DRAWINGS

The apparatus of the invention is further described and explained in relation to the following drawings wherein:

FIG. 3 is an enlarged perspective view, depicting a preferred embodiment of the split nut of the invention;

FIG. 4 is a top plan view of the split nut of FIG. 3; and

FIG. 5 is an enlarged cross-sectional elevation view taken along line 5-5 of FIG. 4.

DESCRIPTION OF THE PREFERRED EMBODIMENTS

As used in this description, the term "split nut" refers to internally threaded nut 10, as further described below, which has a gap in a side wall that permits the nut to be moved laterally into a position where it can be threaded onto an externally threaded structure. The split nut of the invention can be made of metal, in which case it is substantially rigid, or of a polymeric material that is more flexible, although flexing of the split nut to increase the size of the gap is not required for use of the invention.

Figure 1:
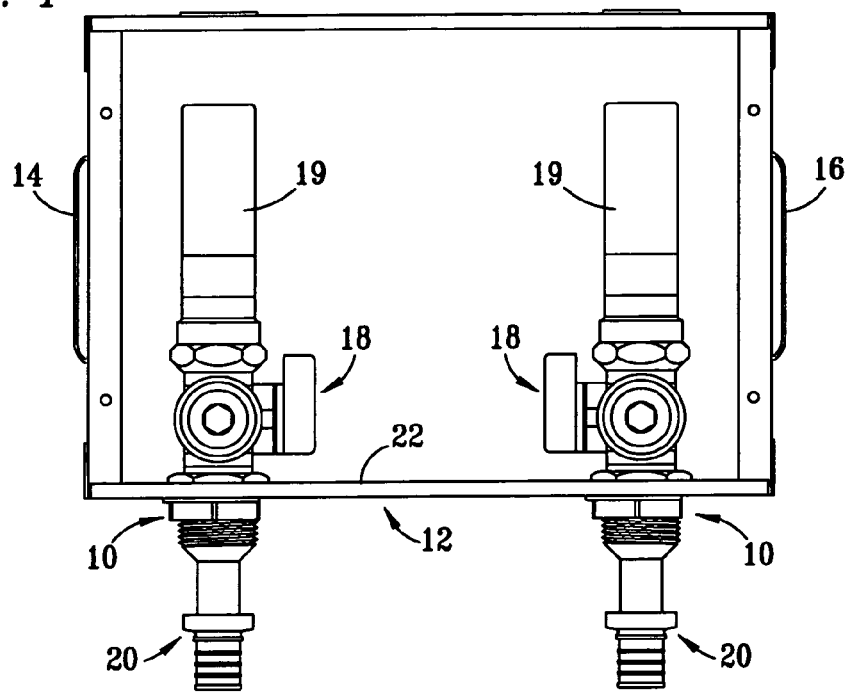
FIG. 1 is a front elevation view of an appliance outlet box suitable for in-wall mounting having two water supply valves with REHAU hose barb fittings mounted to the bottom wall of the outlet box using the split nuts of the invention.

Referring to FIG. 1, split nut 10 is shown in a preferred use for releasably securing quarter-turn valve assemblies 18 to bottom wall 22 of an appliance outlet box 12 suitable for in-wall installation, particularly outlet boxes for washing machines or ice makers. Each valve assembly 18 comprises a side-mounted handle to facilitate the use of a water hammer arrester 19 disposed above each valve assembly. Each valve assembly 18 has a hose barb fitting 20, preferably of the type marketed by REHAU Incorporated, with a flange disposed between the hose barb and the valve. In-wall outlet box 12 is typically made of molded plastic and is preferably provided with brackets 14, 16 for the attachment of straps (not shown) or other similarly effective means that can be secured to studs by nails or other fastening devices when mounting outlet box 12 in a stud bay of a wall. Hose barb fittings 20 are desirably provided for use in connecting PEX water supply lines to each of valve assemblies 18.

Figure 2:
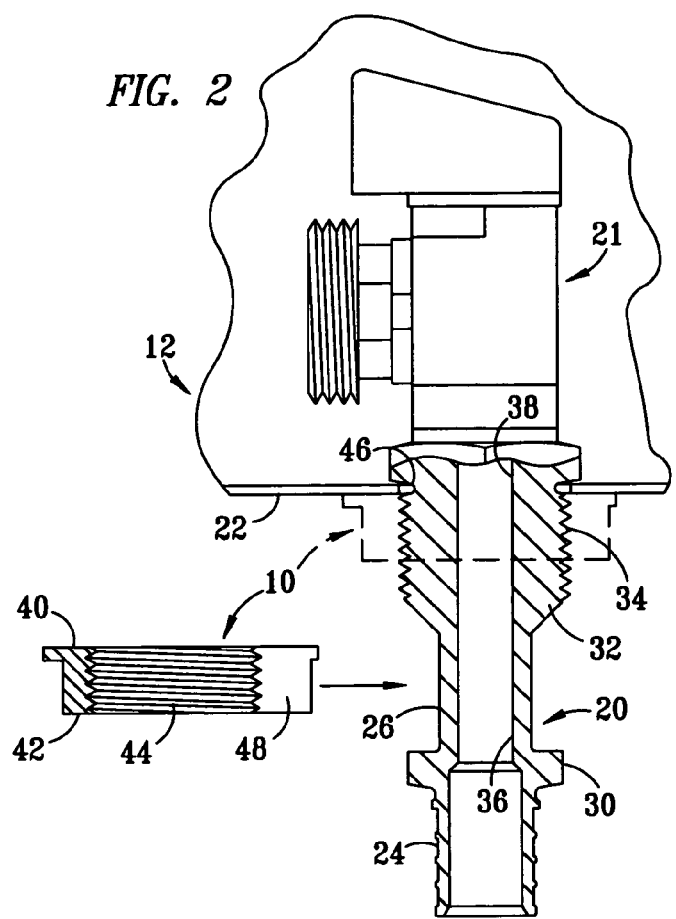
FIG. 2 is an enlarged side elevation view, partially broken away and partially in cross-section, illustrating the manner in which the split nut of the invention is applied to a different water supply valve assembly during installation of the valve assembly to the bottom wall of an outlet box.

Referring to FIG. 2, water supply valve assembly 21 is shown in relation to bottom wall 22 of outlet box 12 prior to the attachment of split nut 10. In this view, valve assembly 21 is a quarter-turn ball valve without a water hammer arrester and with a handle disposed on top of the valve rather than at the side as shown in FIG. 1. Hose barb fitting 20 and externally threaded section 32 ("nipple 32") of the valve are unitarily formed (as shown) or integrally connected as part of valve assembly 21. Hose barb fitting 20 preferably further comprises hose barb section 24 and smooth-wall tubular section 26 with annular flange 30 disposed therebetween. Internal bores 36 of hose barb section 20 and 38 of nipple 32 preferably cooperate to supply fluid, typically potable water, to the inlet side of valve assembly 21. Nut 10 preferably comprises an annular sidewall including hexagonal head 42 and skirt 40, internal threads 46 and a gap 50 in the sidewall defined by walls 48 as shown in FIGS. 3-4. Valve assembly 21 is preferably attached to outlet box 12 by inserting barbed hose fitting 20 and nipple section 32 through aperture 46 in bottom wall 22 of outlet box 12, then moving nut 10 laterally into coaxial alignment with smooth-wall section 26 of hose barb fitting 20, and finally, threading nut 10 onto cooperatively threaded nipple 32 until skirt 40 of nut 10 snugly engages the underside of bottom wall 22 of outlet box 12 as shown by dashed outline in FIG. 2. Valve assembly 21 is preferably formed primarily of brass to resist corrosion when contacted with chlorine-containing potable water, and nut 10 is preferably made of die cast zinc. It will be appreciated, however, that nut 10 can also be made of other metals, or made from a durable polymeric material suitable for the intended application.

The OD of nipple section 32 and hose barb fitting 20 is desirably slightly less than the ID of aperture 46 through bottom wall 22 of outlet box 12 to permit insertion of those unitary (or pre-attached) portions of valve assembly 21 downwardly through aperture 46 prior to the application of nut 10 to externally threaded nipple 32. The OD of annular flange 30 is greater than the ID of nut 10, preventing nut 10 from being passed upwardly over flange 30 prior to threading nut 10 into engagement with external threads 34 of nipple 32. According to published IAPMO standards, the OD of a Rehau flange for a nominal ½ inch PEX connection is 0.840 inches minimum, with no maximum specified. The OD for the valve thread on nipple 32 (assuming a nominal ½ inch NPSM (straight pipe thread)) is 0.813 to 0.823 inches. The ID of the associated split nut 10 is 0.747 to 0.749 inches. The OD of smooth-wall section 26 of hose barb fitting 20 is less than the OD of nipple 32, and the ID of nut 10 is desirably greater than the OD of smooth-wall section 26. This permits nut 10 to be moved laterally to a position where nut 10 is coaxially aligned with bore 36 of smooth-wall tubular section 26 above annular flange 30 of hose barb fitting 20, provided that the minimum distance between gap walls 48 is also greater than the OD of smooth-wall section 26.

Although smaller-diameter section 26 is referred to as a "smooth-wall section" in the context of this preferred embodiment, it will be understood by those of ordinary skill in the art upon reading this disclosure that split nut 10 is similarly useful for engaging threads 34 to releasably secure valve assembly 21 to outlet box 12 no matter what the external configuration of the section adjacent to the externally threaded section, provided that the maximum transverse dimension of the adjacent section is less than the ID of nut 10 and provided that the axial distance between threads 34 and the "blocking structure," in this case annular flange 30, is sufficient to permit nut 10 to be inserted laterally therebetween.

A preferred structure for split nut 10 of the invention is further described in relation to FIGS. 3-5. Nut 10 preferably comprises skirt 40, hexagonal head 42, a plurality of wrench flats 52 disposed around head 42, internal threads 44 and arcuate gap 50 defined by walls 48. Walls 48 are preferably substantially parallel, although parallel walls 48 are not required for the invention. Walls 48 define a gap 50 through the sidewall of split nut 10 that is sufficiently large to receive smooth-wall tubular section 26 between them, but sufficiently small that nut 10 can securely engage external threads 34 of nipple 32 without falling away from them or loosening unintentionally once the threads are engaged and split nut 10 is tightened. Split nut 10 thereby securely holds valve assembly 21 in a fixed positional relationship to outlet box 12 until nut 10 is loosened around nipple 32. A preferred minimum gap 50 equal to about 0.015 inches greater than the OD of smooth-wall tubular section 26 is preferred.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventors are legally entitled.

We claim:

1. The combination of a water supply valve having an inlet side; an externally threaded nipple connected to the inlet side of the water supply valve; a hose barb fitting having a hose barb section, a smooth-walled section having a first outside diameter and a flange disposed between the hose barb section and the smooth-walled section, the flange having a second outside diameter; and an internally threaded nut cooperatively engageable with the externally threaded nipple but having an inside diameter smaller than the second outside diameter, the nut having a side wall comprising an arcuate gap defining an opening sufficient to receive the smooth-walled section of the hose barb fitting laterally through the gap.

2. The combination of claim 1 wherein the arcuate gap has sides that are substantially parallel.

3. The combination of claim 2 wherein the sides of the gap are spaced apart by a distance that is about 0.015 inches greater than the first outside diameter.

4. The combination of claim 1, further comprising an in-wall appliance outlet box.

5. The combination of claim 1 wherein the hose barb fitting is a Rehau hose barb fitting.

6. The combination of claim 1 wherein the nipple and hose barb fitting are unitarily made.

7. The combination of claim 1 wherein the water supply valve and nipple are unitarily made.

8. The combination of claim 1 wherein the nut is made of metal.

9. The combination of claim 8 wherein the metal is die cast zinc.

10. The combination of claim 1 wherein the nut is made of a durable polymeric material.

11. A kit comprising an appliance outlet box, at least one water supply valve assembly and an internally threaded split nut, the water supply valve assembly comprising a valve, an externally threaded nipple in fluid communication with the valve, and a hose barb fitting in fluid communication with the nipple, the external threads of the nipple being cooperatively engageable with the internally threaded split nut, the hose barb fitting having a smooth-walled tubular section, a hose barb section, and a flange disposed between the tubular section and the hose barb section, the flange having a first outside diameter, the smooth-walled tubular section having a second outside diameter, the internally threaded split nut having an inside diameter less than the first outside diameter but greater than the second outside diameter, and a gap in one side of the nut, the gap defining a space sufficiently large to receive the smooth-wall tubular section laterally therethrough and sufficiently small to releasably secure the water supply valve assembly to the outlet box when threadedly engaged with the nipple.

12. The kit of claim 11 wherein the nut is made of metal.

13. The kit of claim 12 wherein the nut is made of die cast zinc.

14. The kit of claim 11 wherein the nut is made of a durable polymeric material.

15. The kit of claim 11 wherein the valve and nipple are unitarily made.

16. The kit of claim 11 wherein the nipple and hose barb fitting are unitarily made.

17. The kit of claim 11 wherein the hose barb fitting is a Rehau hose barb fitting.

* * * * *